United States Patent [19]

Mead et al.

[11] Patent Number: 4,739,374

[45] Date of Patent: Apr. 19, 1988

[54] COLOR IMAGE COPYING SYSTEM

[75] Inventors: David L. Mead; Paul A. McManus, both of Sherwood; Donald R. Titterington, Tualatin; Joern B. Eriksen, Oregon City; Michael D. Jones, Portland, all of Oreg.

[73] Assignee: Tektronix, Inc., Beaverton, Oreg.

[21] Appl. No.: 19,982

[22] Filed: Feb. 27, 1987

[51] Int. Cl.$^4$ .................... G03B 27/54; G03B 27/72
[52] U.S. Cl. ........................ 355/67; 355/20; 355/32; 355/35; 355/38; 358/75
[58] Field of Search ............ 355/32, 35, 38, 67, 355/20; 358/75

[56] References Cited

U.S. PATENT DOCUMENTS

| 4,080,072 | 3/1978 | Failes | 355/32 |
| 4,264,921 | 4/1981 | Pennington, et al. | 358/75 |
| 4,375,649 | 3/1983 | Mir et al. | 355/32 |
| 4,378,568 | 3/1983 | Mir | 355/32 |
| 4,562,462 | 12/1985 | Egan | 358/75 |

Primary Examiner—Monroe H. Hayes
Attorney, Agent, or Firm—John D. Winkelman; Paul S. Angello

[57] ABSTRACT

A color image copying system (10) includes a light modulator (12) that receives incident light rays emanating from a source (14) of light. The light modulator comprises a light dispersing apparatus (54) that disperses different wavelengths of the incident light rays to different locations on a focal surface (60). A filter mask (68) aligned with the focal surface transmits preselected wavelengths of the ultraviolet light and blocks light of all other wavelengths. Each of a set of light valves (86, 88, 90) receives a different wavelength of light transmitted by the filter mask and intensity modulates it in accordance with image pixel information provided by an information source (16). An optical focusing apparatus (56) focuses the intensity-modulated wavelengths of light to a relatively small location (20) on an image focal surface (22) which is aligned with a light-sensitive medium (24). The light focused at the location exposes the light-sensitive medium to each of the wavelengths of light for a particular period of time determined by the image pixel information. The location to which the intensity-modulated light is focused is sequentially aligned with adjacent regions of the light-sensitive medium in synchronism with the delivery of image pixel information corresponding to the adjacent regions. This process continues in pixel-by-pixel fashion across the surface of the light-sensitive medium to form a color image copy in a single exposure pass over such surface.

9 Claims, 2 Drawing Sheets

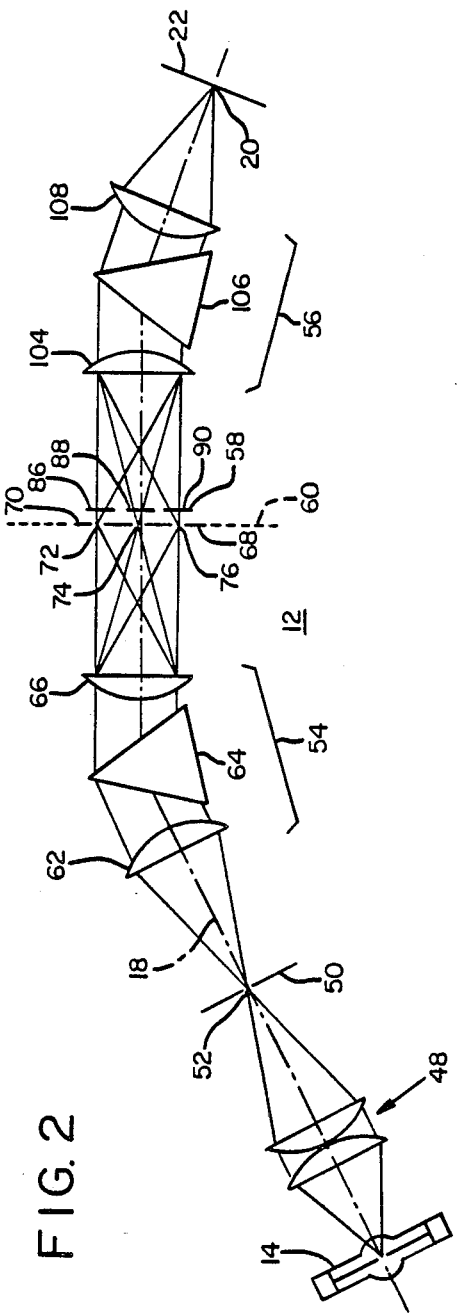

COLOR IMAGE COPYING SYSTEM

TECHNICAL FIELD

The present invention relates to color image copying systems and, in particular, to such a system that intensity modulates each of preselected image-carrying light beams of different wavelengths in accordance with different image pixel information and sequentially exposes a light-sensitive medium to the intensity-modulated light beams in pixel-by-pixel fashion to synthesize therein a color copy of the image.

BACKGROUND OF THE INVENTION

One type of heretofore available copying system synthesizes a color copy of an image by exposing three times in raster-scan fashion the entire surface of a light-sensitive paper to ultraviolet light rays carrying the image. In such a system, three color selective filters receive the image-carrying light rays and separate them into three wavelength components corresponding to the colors red, green, and blue. The light-sensitive paper is typically exposed to only one of the three wavelength components during a given exposure pass.

A copying system of this type suffers from the disadvantage of requiring three complete raster-scan passes over the surface of the light-sensitive paper to form the color copy, thereby consuming a relatively large amount of time to complete the copying process. Moreover, such a copying system relies upon the mechanical accuracy of the raster-scanning apparatus to provide on the light-sensitive paper convergence of the light rays corresponding to the three color components of an image pixel.

SUMMARY OF THE INVENTION

An object of the present invention is, therefore, to provide a color image copying system that produces copies of high color quality at relatively high processing rates.

Another object of this invention is to provide such a system in which light rays corresponding to an image pixel are optically converged to a location on the light-sensitive paper.

A further object of this invention is to provide such a system in which a color copy is formed in a single exposure pass over a light-sensitive medium.

The color image copying system of the present invention includes a light modulator that receives incident light rays of many wavelengths emanating from a light source. The light modulator disperses the wavelengths of incident light and intensity modulates preselected ones of them in accordance with different image pixel information. The intensity-modulated light rays sequentially expose a light-sensitive medium in pixel-by-pixel fashion to form therein a color copy of the image.

The light modulator comprises a light dispersing apparatus, which preferably includes a prism, that receives the incident light rays and disperses different wavelengths thereof to different locations on a focal plane. A filter mask aligned with the focal plane transmits preselected wavelengths of the light and blocks light of all other wavelengths. Each of the wavelengths of light transmitted by the filter mask is contained within a corresponding narrow band of wavelengths. Each one of a set of light valves receives a different wavelength of light transmitted by the filter mask and intensity modulates it in accordance with image pixel information provided by an information source. An optical focusing apparatus, which also preferably includes a prism, focuses the intensity-modulated wavelengths of light to a relatively small location on an image focal surface which is aligned in the plane of the light-sensitive medium.

The light focused at the location exposes the light-sensitive medium to each of the wavelengths of light for a particular period of time determined by the image pixel information. The location on the image focal surface to which the intensity-modulated light is focused is sequentially aligned with adjacent regions of the light-sensitive medium. Synchronously, the light is modulated such that it delivers the correct image pixel information to each of the adjacent regions. The above process continues in pixel-by-pixel fashion across the surface of the light-sensitive medium to form a color image copy in a single exposure pass over such surface.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 2 is a schematic diagram of the optical components included in the light modulator of FIG. 1.

FIG. 3 is an enlarged cross-sectional view of selected optical components of the light modulator of FIG. 2.

FIG. 4 is a fragmentary sectional view taken along lines 4—4 of FIG. 1.

DETAILED DESCRIPTION OF PREFERRED EMBODIMENT

Figure 1:
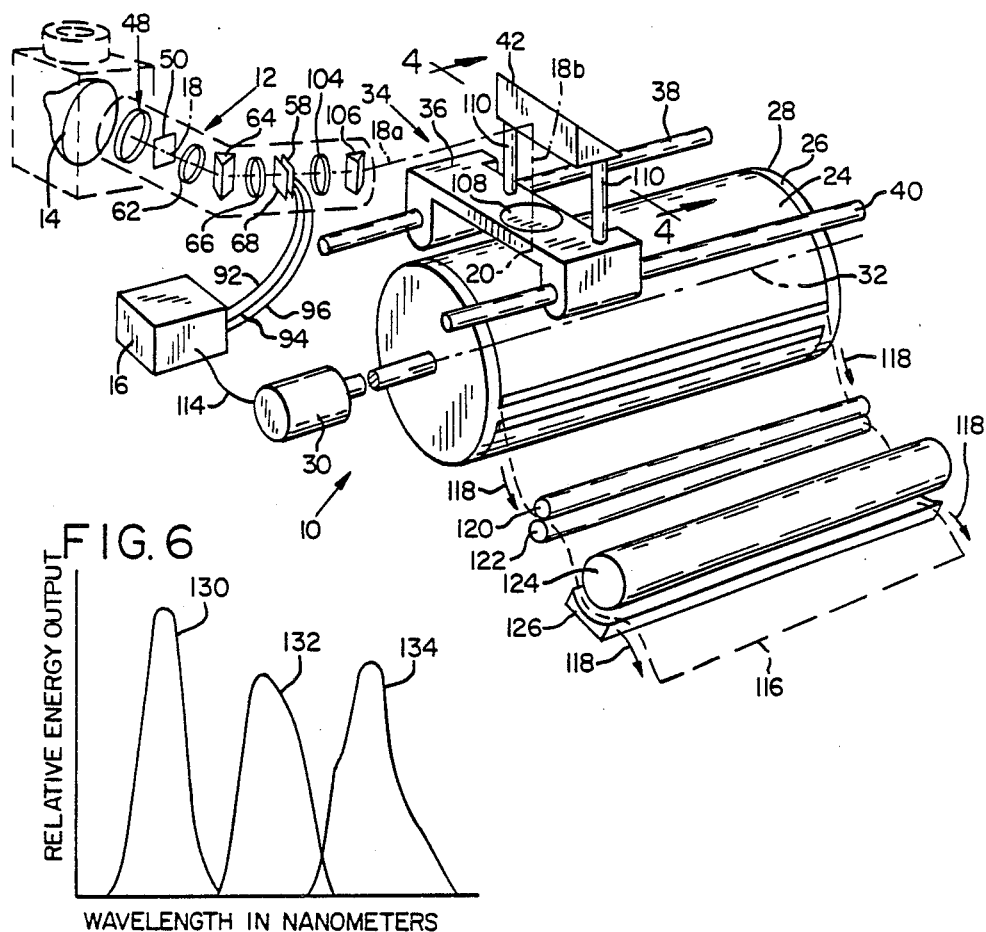
FIG. 1 is a diagram of a color image copying system employing the light modulator of the present invention.

With reference to FIG. 1, a color image copying system 10 of the present invention includes a light modulator 12 which intensity modulates three separate beams of light emanating from a light source 14. Light source 14 is one which emits wavelengths of light that are compatible with the characteristics of a light-sensitive medium to which the light is directed, as will be further described below. Copying system 10 is described herein by way of example only to employ a medium that is sensitive to beams of ultraviolet light having wavelengths of 365 nanometers, 404 nanometers, and 436 nanometers. Light source 14 can, therefore, be a mercury vapor arc lamp or another suitable source of ultraviolet light. Modulator 12 intensity modulates each of the three beams of light in accordance with different image pixel information provided by an information source or control circuit 16 and directs the modulated beams of light along an optic axis 18 toward a focal location 20 (shown in phantom) on an image focal surface 22 (FIG. 2). Focal location 20 on focal surface 22 represents a point at which the modulated beams of light converge to form a single beam that exposes a region on a light-sensitive medium or paper 24.

Light-sensitive paper 24 is mounted on the surface 26 of a drum 28, which a motor 30 drives for rotation at approximately 1000 rpm about an axis 32. extending through the center and along the length of the drum. An exposure beam positioning system 34 comprises a carriage 36, which is mounted on a pair of spaced-apart parallel rails 38 and 40 for sliding movement along the length and above surface 26 of drum 28. Carriage 36 carries a mirror 42 that changes the direction and length of optic axrs 18 as carriage 36 moves along the length of drum 28. Motor 30 together with an associated gear assembly (not shown) moves carriage 36 along rails 38 and 40. The delivery of image pixel information that modulates the three beams of light is synchronized to the rotation of drum 28 and the movement of mirror 42 effectively to spirally move focal location 20 along surface 26 of drum 28 and expose each of the regions of light-sensitive paper 24 to light beams modulated by the corresponding pixel image information, thereby to form therein a color copy of the image.

FIG. 2 shows the optical components of and certain pertinent focal regions within light modulator 12. All of the optical components of modulator 12 are disposed along and positioned generally centrally about optic axis 18. With reference to FIG. 2, light modulator 12 employs a condenser lens assembly 48 and an opaque plate 50 with a circular aperture 52 to form a point source of the wavelengths of ultraviolet light emanating from light source 14. The light exiting aperture 52 of plate 50 is directed to first and second optical subassemblies 54 and 56, which are separated by a light gating means or assembly 58. Optical subassemblies 54 and 56 include similar optical elements arranged in reverse order along optic axis 18.

First optical subassembly 54 functions as a light dispersing apparatus that receives the ultraviolet light of different wavelengths propagating from aperture 52 of plate 50 and disperses each one of them to a different location on an aerial focal surface 60, which constitutes a plane positioned generally perpendicular to optic axis 18. Light dispersing apparatus 54 includes a plano-convex collimation lens 62 that is positioned one focal length away from plate 50 to collimate the light propagating through aperture 52 of plate 50 and direct the light toward an equilateral prism 64, which disperses light of different wavelengths and has a minimum deviation angle. The different wavelengths of ultraviolet light propagate through prism 64 along separate divergent paths toward a plano-convex focusing lens 66, which focuses each wavelength of light exiting dispersing apparatus 54 toward a different location on focal surface 60.

The light exiting dispersing apparatus 54 strikes a filter mask 68 that is aligned with focal surface 60. Filter mask 68 includes a major surface 70 that is opaque to ultraviolet light except for three transparent areas 72, 74, and 76 that are aligned with the locations on focal surface 54 at which the respective 365 nm, 404 nm, and 436 nm wavelengths of light intercept. Each of the transparent areas 72, 74, and 76 constitutes an elongated narrow slit that extends along major surface 70 in a direction perpendicular to the plane of FIG. 2 and has a width 78 (FIG. 3) of approximately 100 microns. Three beams of 365, 404, and 436 nanometer light exit, therefore, filter mask 68.

The three beams of light passing through filter mask 68 strike light gating assembly 58, which includes three separate light valves 86, 88, and 90. Light valves 86, 88, and 90 are aligned generally in a plane and are spaced apart so as to intercept the beams of 365, 404, and 436 nanometer light, respectively, passing through filter mask 68. Each of light valves 86, 88, and 90 intensity modulates the beam of light passing through it in accordance with image pixel information delivered to such light valve from a respective output 92, 94, and 96 of control circuit 16 (FIG. 1). The image pixel information provided by control circuit 16 corresponds to the intensity of different color components of the image. Each of the light valves transmits light for a duration of time that corresponds to the proportional amount of one of three primary colors in the image pixel.

FIG. 3 shows in detail filter mask 68 and light gating assembly 58. With reference to FIG. 3, filter mask 68 includes a glass substrate 98 onto which a metallic thin film surface 100 is applied. Portions of surface 100 are selectively removed to provide transparent areas 72, 74, and 76. Light gating assembly 58 supports light valves 86, 88, and 90 in a single structure to provide a compact system. Each of light valves 86, 88, and 90 has a light transmissive slit width 102 of approximately 40 microns and is positioned adjacent the respective apertures 72, 74, and 76 of filter mask 68. The intensity-modulated beams of light exiting light valves 86, 88, and 90 propagate toward the second optical subassembly 56, which functions as a focusing apparatus for incident light rays.

With reference to FIG. 2, light focusing apparatus 56 includes a plano-convex converging lens 104 which is positioned one focal length away from focal surface 60 to converge the three intensity-modulated beams of light and project them toward an equilateral prism 106, which mixes the three beams of light incident on it. The three beams of light propagating through and exiting prism 106 strike a focusing lens 108 which converges the three beams toward focal location 20 on focal surface 22 of drum 28. (The mirror 42 (FIG. 1) positioned between prism 106 and focusing lens 108 merely redirects the path of optic axis 18 in the implementation of exposure beam positioning system 34.) The point at which the three beams converge defines the image pixel, and the relative exposure times of the three wavelengths of light at a particular region on paper 24 determine the color content of the image, as will be further described below.

Dispersing apparatus 54 and focusing apparatus 60 of modulator 12 cooperate to receive light rays that emanate from a point source (aperture 52 of opaque plate 50) and to transmit light rays that converge to a point (focal location 20 on focal surface 22). This is accomplished by including in dispersing apparatus 54 and in focusing apparatus 60 components which are of similar optical design and are arranged in reverse order along optic axis 18. In particular, collimation lens 62, prism 64, and focusing lens 66 of dispersing apparatus 54 correspond to, respectively, focusing lens 108, prism 106, and converging lens 104 of focusing apparatus 60. As respects dispersing apparatus 54, collimation lens 62 receives diverging light rays emanating from the point source, collimates the light rays, and directs such light rays to prism 64. As respects focusing apparatus 60, focusing lens 108 receives collimated light rays exiting prism 106 and converges such light rays to a point at focal location 20. The light beams exiting prism 64 propagate along diverging paths, but the light rays entering prism 106 propagate along converging paths. Although light rays of different wavelengths exiting a prism form different angles with respect to its surface normal, the angles of divergence and convergence of corresponding wavelengths of light exiting prism 64 and entering prism 106, respectively, are of equal magnitude but of opposite rotational sense. This facilitates the convergence of light of different wavelengths to a point by modulator 12.

With reference to FIGS. 1 and 4, the optical components of modulator 12 other than focusing lens 108 are enclosed in and supported by a tubular case 109. Carriage 36 of exposure beam positioning system 34 moves mirror 42 and focusing lens 108 in one direction along the length of drum 28 during the exposure of paper 24. Carriage 36 includes two side brackets 110 that support mirror 42 above focusing lens 108, which is positioned on the periphery of a bore in the upper surface of carriage 36. Mirror 42 is oriented so that the three light beams propagating along a generally horizontal component 18a of optic axis 18 reflect along a generally vertical component 18b of optic axis 18 toward the center of focusing lens 108. Carriage 36 supports focusing lens 108 above the surface of drum 28 at a distance 112 of an amount that converges the three light beams to focal location 20. The translational motion of carriage 36 changes, therefore, the length of horizontal component 18a of optical axis 18 during the exposure process.

Motor 30 drives drum 28 for rotation about axis 32 and provides translational motion of carriage 36 along rails 38 and 40. The translational motion of carriage 36 is coordinated with the rotation of drum 28 so that focal location 20 describes a series of adjacent rings around the circumference of drum 28 during the exposure process of paper 24. The effect is, therefore, to spirally move focal location 20 across the surface of drum 28 during the exposure process of paper 24. A timing signal is transmitted from motor 30 to control circuit 16 along a conductor 114. The timing signal synchronizes the modulation of the three beams of light with the movement of drum 28 and carriage 36. Specifically, the timing signal updates control circuit 16 as to the position of focal location 20 on paper 24 so that each region on paper 24 can be properly aligned with focal location 20 as the three light beams are provided with image pixel information corresponding to such region.

The time interval for writing image pixel information in each region of paper 24 is preferably about 50 microseconds. Color half-tones are generated by beams exposing a region to each of the three light beams for different durations within the 50 microsecond write time. To accommodate the 50 microsecond write time, the light valves 86, 88, and 90 must operate at a frequency of at least 20 KHz. Light valves utilizing a ferroelectric smectic C liquid crystal can operate at this frequency. Other light valve technologies suitable for this application include those of the PLZT and electromechanical types.

Paper 24 has a light-sensitive coating that includes microcapsules of any of the types manufactured by Mead Corporation and described in U.S. Pat. Nos. 4,399,209 and 4,440,846. One of the microcapsules contains one of three monomers, a photoinitiator, and a colorless dye precursor. The exposure of paper 24 to one of the three wavelengths of light converts a corresponding one of the three liquid monomers to a solid polymer. Exposed paper 116 (shown in phantom in FIG. 1) passes along guides (not shown) in the direction indicated by arrows 118 toward pressure rollers 120 and 122. As exposed paper 116 passes between pressure rollers 120 and 122, the image is developed by bringing the microcapsules in contact with a layer of acidic developer. The unexposed microcapsules rupture and react with the developer to form a dye and thereby provide a visible image. Exposed paper 116 becomes a positive medium in which exposed areas are light and unexposed areas are dark.

Upon completion of the processing by pressure rollers 120 and 122, exposed paper 116 passes between a roller 124 and a heating device 126. Heating device 126 accelerates the dye formation to provide a color copy of the image in a relatively short period of time. Heating the paper to about 100° C. provides an image with fully saturated colors in several seconds.

The above-described process has been described with reference to microencapsulated paper that includes a layer of developer. The present invention can be practiced also with separate microencapsulated and developer sheets to provide an image transfer copying system. Such a system would use sheets of developer paper and a guide mechanism for bringing a sheet of developer paper into contact with a sheet of microencapsulated paper between pressure rollers 120 and 122. The dye would then be formed in the unexposed areas of the developer paper, and heating device 126 would be used to heat the paper.

Figure 5:
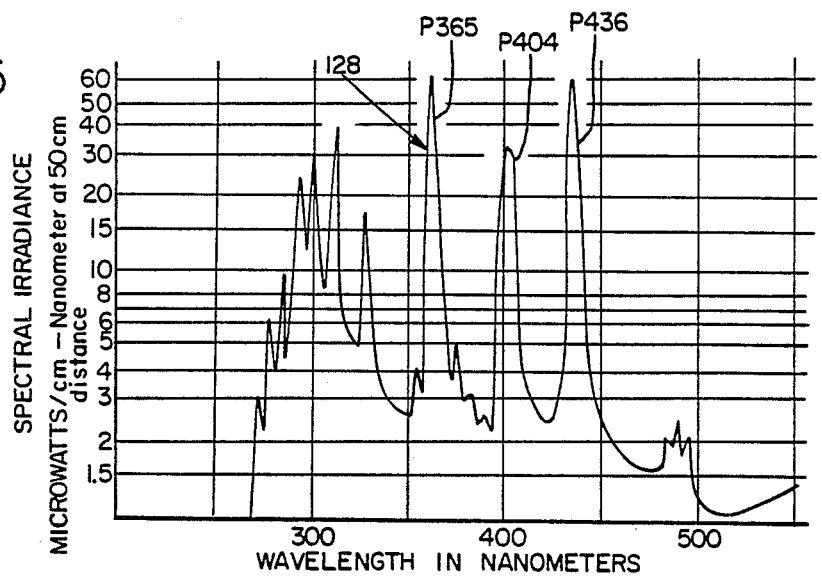
FIG. 5 is a graphical representation of the spectral irradiance characteristic of a light source that is suitable for use with the present invention.

FIG. 5 is a graphical representation of the ultraviolet spectral irradiance characteristic 128 for a 200 watt mercury vapor lamp, as a preferred light source 14. With reference to FIG. 5, spectral irradiance characteristic 128 of the mercury vapor lamp includes peaks at the wavelengths of 365, 404, and 436 nanometers, which peaks are denominated $P_{365}$, $P_{404}$, and $P_{436}$, respectively. Transparent areas 72, 74, and 76 of filter surface 100 of filter mask 68 are positioned to transmit 365, 404, and 436 nanometer light, respectively. Exposure of light-sensitive paper 24 of the type described above to 365, 404, and 436 nanometer light affects the proportional amounts of the primary colors green, red, and blue, respectively, in a developed image.

Figure 6:
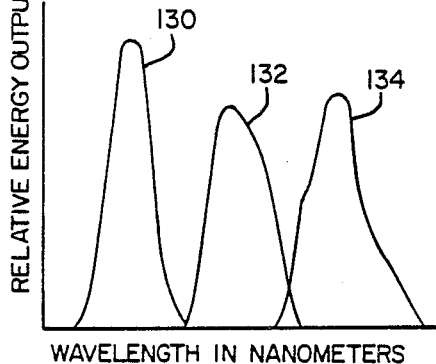
FIG. 6 is a graphical representation of the relative intensities of different wavelengths of light transmitted by the light modulator of the present invention.

FIG. 6 shows the relative amounts of light energy a first band 130 of 365 nanometer light, a second band 132 of 404 nanometer light, and a third band 134 of 436 nanometer light measured at the output, i.e., at focal location 20, of modulator 12. Bands 130, 132, and 134 correspond to the respective primary colors green, red, and blue in a sheet of light-sensitive paper 24. Each of bands 130, 132, and 134 has a bandwidth of less than 23 nanometers full-width-half-maximum (FWHM), thereby indicating that modulator 12 transmits the 365, 404, and 436 nanometer light within narrow bandwidths. Although it is desirable that bands 130 and 134 have relatively narrow bandwidths, it is critical that band 132 have a narrow bandwidth to provide adequate separation between each of the three bands of transmitted light. Inadequate separation between adjacent bands of transmitted light would cause one of the beams of light to form in paper 24 more than one primary color, resulting in inaccurate color copying.

It will be appreciated that since each of the wavelengths of light emanating from light source 14 is dispersed toward a different location on focal surface 60, the positions of transparent areas 72, 74, and 76 on filtering surface 70 of filter mask 68 determine the three wavelengths of light transmitted. Similarly, the width 78 of transparent areas 72, 74, and 76 determines the bandwidths of wavelengths of light transmitted. Filter mask 68 provides, therefore, an easily adaptable means for selecting the resolution and the particular wavelengths of the light to be transmitted.

Moreover, since light-sensitive paper 24 is sensitive to ultraviolet light, the optical elements of modulator 12 must efficiently transmit such light. Optical elements made of quartz efficiently transmit ultraviolet light but are relatively expensive. One preferred optical material would be, for example, BK-7 crown glass, which efficiently transmits ultraviolet light and is less expensive than quartz.

It will be obvious to those having skill in the art that many changes may be made in the above-described details of the preferred embodiment of the present invention without departing from the underlying principles thereof. For example, to impart the image pixel information intensity modulation of the image-carrying light rays can be accomplished by exposing the light-sensitive paper to light of different intensities during an exposure time of constant duration. The scope of the present invention should be determined, therefore, only by the following claims.

We claim:

1. In a color image copying system including a light source that directs plural wavelengths of light to a light modulator, the light modulator modulating preselected ones of the wavelengths of light in accordance with image pixel information received from an information source, the modulated wavelengths of light being transmitted to expose each one of plural regions of a light-sensitive medium to develop within each region a pixel of an image and thereby synthesize a color copy of the image, the improvement comprising:

dispersing means including a first prism that receives plural wavelengths of light for dispersing preselected ones of them to different locations on a focal surface;

gating means aligned with the focal surface for modulating the preselected wavelengths of light in accordance with the pixel information;

focusing means including a second prism and optically communicating with the gating means for focusing the modulated light toward an image focal surface, the second prism being of similar optical design to that of the first prism; and aligning means for aligning the image focal surface with each of the plural regions of the light-sensitive medium.

2. The copying system of claim 1, which further comprises filtering means proximally aligned with the focal surface for transmitting the preselected wavelengths of light within narrow bandwidths and blocking all other wavelengths of light.

3. The copying system of claim 2 in which the filtering means comprises a filter mask having opaque areas and transparent areas, the transparent areas being aligned with the locations on the focal surface to which the preselected wavelengths of light are dispersed.

4. The copying system of claim 1 in which the gating means comprises plural light valves of which each is aligned with a location on the focal surface to which location one of the preselected wavelengths of light is dispersed.

5. The copying system of claim 1 in which the first prism disperses plural wavelengths of light and directs them toward a focusing lens, and in which the second prism receives and collimates the preselected wavelengths of light transmitted by a converging lens, the focusing lens being of similar optical design to that of the converging lens.

6. A system for providing a color copy of an image, comprising:

a light source providing plural wavelengths of light;

an information source sequentially providing pixel information;

light dispersing means including a first prism positioned to receive the plural wavelengths of light for projecting first and second preselected ones of the plural wavelengths of light toward different locations on a focal surface;

gating means aligned with the focal surface for modulating the first and second preselected wavelengths of light in accordance with the pixel information;

light focusing means positioned to receive the modulated first and second preselected wavelengths of light for focusin the light toward a location on an image focal surface, the light focusing means including a second prism of an optical design similar to that of the first prism;

a light-sensitive medium in which first and second colors are developed in response to exposure thereof by the respective first and second preselected wavelengths of light;

aligning means for sequentially aligning each one of plural regions of the light-sensitive medium with the location on the image focal surface; and synchronizing means for synchronizing the modulation of the first and second preselected wavelengths of light with the sequential alignment of the plural regions of the light-sensitive medium to form in each of the regions a pixel of the image, thereby to synthesize in the light-sensitive medium a color copy of the image.

7. The system of claim 6 in which the modulating means further comprises a filter mask proximally aligned with the focal surface and having opaque areas and transparent areas, the transparent areas being aligned with the locations on the focal surface toward which the preseleced wavelengths of light are projected.

8. The system of claim 6 in which the first prism disperses plural wavelengths of light and directs them toward a focusing lens, and in which the second prism receives and collimates the preselected wavelengths of light transmitted by a converging lens.

9. The system of claim 8 in which the focusing lens is of similar optical design to that of the dispersing lens.

* * * * *